(No Model.)
J. S. ADAMS, C. E. DAILEY & J. N. TANNAHILL.
Device for Converting Motion.

No. 241,176. Patented May 10, 1881.

Witnesses.

Inventors.

UNITED STATES PATENT OFFICE.

JOHN S. ADAMS, CHRISTIAN E. DAILEY, AND JOHN N. TANNAHILL, OF WATERLOO, IOWA.

DEVICE FOR CONVERTING MOTION.

SPECIFICATION forming part of Letters Patent No. 241,176, dated May 10, 1881.

Application filed April 6, 1881. (No model.)

*To all whom it may concern:*

Be it known that we, JOHN S. ADAMS, CHRISTIAN E. DAILEY, and JOHN N. TANNAHILL, of Waterloo, in the county of Black Hawk and State of Iowa, have invented certain new and useful Improvements in Converting Motion; and we do hereby declare the following to be a full, clear, and exact description of the invention, such as will enable others skilled in the art to which it pertains to make and use it, reference being had to the accompanying drawings, which form part of this specification.

Our invention relates to an improvement in devices for converting motion; and it consists in the combination of a large gear-wheel, which is connected to the cranked shaft, and which wheel meshes with two pinions which are placed upon the same shaft, and connected thereto by means of pawls and ratchets, and which shaft is provided with a large driving-wheel at one end for the purpose of communicating motion to a second shaft, upon which the balance-wheel is secured, whereby a reciprocating motion is converted into a steady rotary one, as will be more fully described hereinafter.

The object of our invention is to construct a cheap, simple machine, which can be attached to a windmill, steam-engine, or any other machine which has a reciprocating motion, to convert the motion into a rotary one, so that it can be applied to running machines of all kinds.

Figure 1:
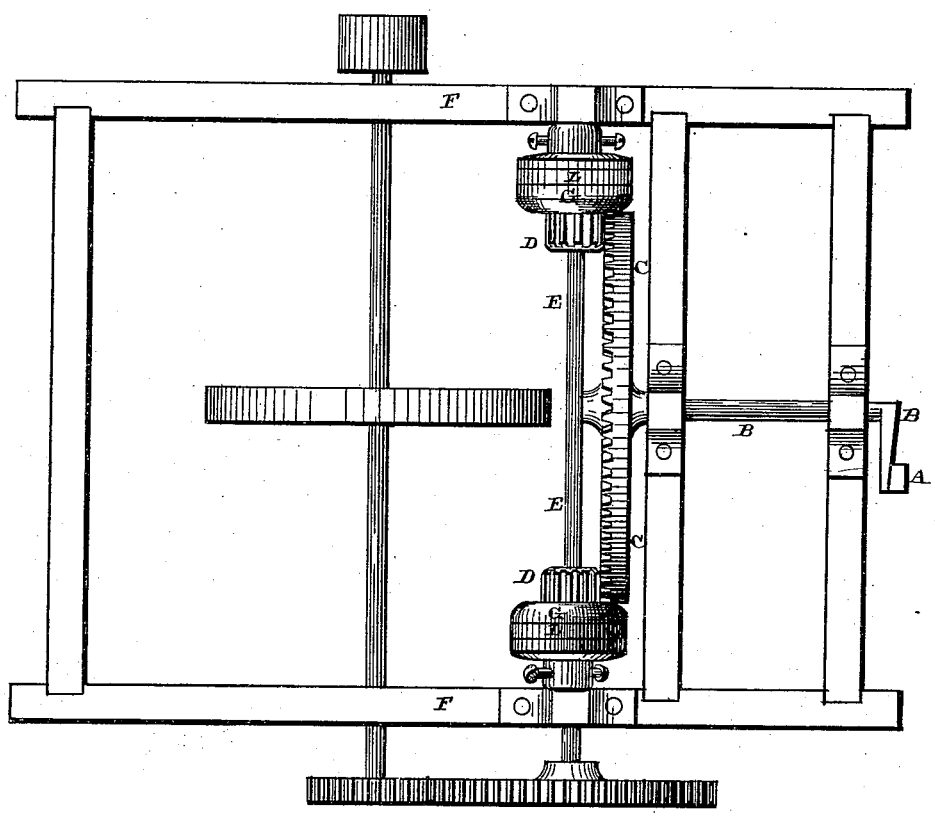
Figure 2:
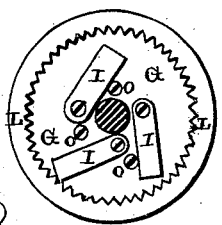

Figure 1 is a plan view of a machine embodying our invention. Fig. 2 is a detail view of the ratchets and pawls by means of which the beveled pinions are connected or attached to their shaft.

A represents the pitman, which may be connected directly to the crank of a wind-wheel, to a piston-rod, or to any moving body which has a reciprocating motion. This pitman is connected to the cranked shaft B, which has the large driving-wheel C secured to its inner end. This wheel meshes with the two pinions D, which are placed loosely upon the shaft E, which extends across the frame F at right angles to the cranked shaft B. Each one of these pinions is secured to the outside of the flat plate or disk G, each one of which plates has pivoted to its inner side three or any suitable number of dogs, I. These dogs are held loosely in position by the pivot which passes through one end, while the other end is free to move outward and downward as the driving-wheel causes the pinions to revolve. Secured to the inner side of each one of these plates are three stops, O, against which the outer ends of the dogs strike, and which stops prevent the outer ends of the dogs from falling against the inner end of the dog that is next to it. Each one of these plates is placed in direct contact with the ratchet-plate L, which ratchet-plate is hollowed out on its inner side, and has its ratchet formed in its inner edge. These ratchet-plates are rigidly secured to the shaft, and when the pinions are alternately turned in opposite directions by the large driving-wheel the dogs which are attached to the inner sides of the flat plates or disks alternately engage with the ratchet-teeth and force the shaft continuously around in one direction. As the large driving-wheel always acts upon the two pinions at the same time, the pinions and dogs are turned in opposite directions, so that when one pinion is moved in one direction its dogs slip idly around without engaging with the ratchet-teeth; but while this pinion is turning idly upon the shaft the dogs of the other pinion engage with the ratchet-teeth and force the shaft constantly around. The moment the movement of the large driving-wheel is reversed the action of the pinion and dogs is also reversed, and the dogs which were slipping idly around propel the shaft forward.

There will be a number of shafts and intermediate gearing-wheels in proportion to the speed which it is desired to obtain, though only two shafts are here shown.

A motor constructed as above described, having a driving-wheel and pinions provided with ratchets, takes up less room, and there are a fewer number of parts and a more steady and even motion is obtained, than where a different form of gearing is used.

Having thus described our invention, we claim—

1. The combination of the pitman, the cranked shaft provided with a gear-wheel, the two pinions placed upon the same driving-shaft, and each one provided with dogs, and a ratchet, whereby a reciprocating motion is converted into a rotary one, substantially as shown.

2. The combination of a pinion having attached to it a disk provided with a number of pivoted dogs and suitable stops, O, and the internal ratchets, which are secured to the shaft, substantially as shown and described.

In testimony whereof we affix our signatures in presence of two witnesses.

JOHN STURGIS ADAMS.
CHRISTIAN EDGAR DAILEY.
JOHN NELSON TANNAHILL.

Witnesses:
HIRAM CHAMPLIN,
MORTIMER LEARN.